ARRANGEMENT FOR DEFINING THE BUSY AND IDLE STATES OF THE LINKS OF A SWITCHING NETWORK

Filed March 23, 1965

4 Sheets-Sheet 1

INVENTOR
F. F. TAYLOR
BY John C. Albert
ATTORNEY

July 30, 1968 F. F. TAYLOR 3,395,252

ARRANGEMENT FOR DEFINING THE BUSY AND IDLE STATES OF THE LINKS OF A SWITCHING NETWORK

Filed March 23, 1965 4 Sheets-Sheet 2

1

3,395,252

ARRANGEMENT FOR DEFINING THE BUSY AND IDLE STATES OF THE LINKS OF A SWITCHING NETWORK

Frank F. Taylor, Asbury Park, N.J., assignor to Bell Telephone Laboratories, Incorporated, New York, N.Y., a corporation of New York Filed Mar. 23, 1965, Ser. No. 441,974

5 Claims. (Cl. 179—18)

ABSTRACT OF THE DISCLOSURE

A differentially wound magnetically latching ferreed relay is inserted in series with the control conductor of each link of a ferreed telephone switching network in such a manner that one of two windings of the differential ferreed relay is shunted when it is in the operated state. The busy-idle condition of a link is determined by measuring the impedance of the control conductor which includes the windings of the differential ferreed relay. When a crosspoint of a link is operated, the differential ferreed relay is released in response to the operate current in the link control conductor, thereby causing the impedance of the control conductor to change from a first low value to a second high value indicating a change from idle to busy.

This invention relates to communication switching networks and, more particularly, to an end-marked space division network which employs electromechanical crosspoints.

Space division networks may be implemented by electromechanical devices such as step-by-step switches, crossbar switches and relays and by electronic devices such as gas tube and transistor crosspoints. The gas tube and transistor crosspoint space division networks generally utilize the lockout characteristics of such devices to provide end-marked networks in which a network path is established by applying marking potentials to the network terminals to be interconnected. In such end-marked networks terminal and internal node holding potentials maintain a path in the conductive state after it has been established under the control of the network marking potentials. When such paths are to be released, the terminal holding potentials are removed and the links of the path are released. Such electronic networks usually provide unbalanced single wire circuit transmission paths.

Electromechanical switching networks generally provide balanced 2-wire or 4-wire transmission paths and supervisory signaling for maintaining an established path between connected devices may be by way of a switched sleeve conductor or by means of control arrangements external to the network. Space division switching networks which have sleeve conductors are found in the Bell System crossbar system and in the Strowger step-by-step systems. A system which employs a space division electromechanical switching network without a sleeve conductor is described in the copending application of A. H. Doblmaier-R. W. Downing-M. P. Fabisch-J. A. Harr-H. F. May-J. S. Nowak-F. F. Taylor-W. Ulrich, Ser. No. 334,875, filed Dec. 31, 1963. The network for this system is described in Part 2 of the Bell System Technical Journal for September 1964 starting at pp. 2193 and 2221. In the system of Doblmaier et al. a network map which is a record of the busy-idle states of all of the links of the network is maintained in a bulk temporary memory. Paths in this network are maintained by magnetic latching switches and path release is under the control of a program controlled system processor.

There are many telephone switching systems which employ 4-wire networks and the provision of electro-

2 mechanical crosspoints which have five sets of contacts for switching the four transmission conductors and the sleeve conductor creates a substantial problem.

Accordingly, it is an object of this invention to maintain a record of the busy-idle states of the possible paths through a network by means of memory elements which are controlled directly by the network control paths.

In one specific illustrative embodiment of my invention differentially wound ferreeds are employed as the crosspoint devices of a network and I provide this busy-idle record for each switch path by including in each series control conductor for that switch an additional differentially wound ferreed; these ferreeds may be of the type described in T. N. Lowry Patent 3,037,085, issued May 29, 1962, to which reference may be made for a further description.

Normally the two control windings of a differentially wound ferreed are identical and each winding has the same impedance value. In accordance with my invention, however, I provide that one control winding of the path busy-idle element be of the same low impedance as the control windings of the switches within the module, but that the other control winding of the path busy-idle switch be of a substantially higher impedance value and, specifically, be higher than the summation of impedances of all the series connected control windings in the control conductor which is employed between the marked network terminals. The path busy-idle ferreed further has its contacts connected across the high impedance winding.

It is characteristic of differential operation of ferreeds that current through both control windings is required to operate the ferreed contacts, whereas current through either control winding alone will cause release of the ferreed contacts. Accordingly, control current supplied to a control conductor including the path busy-idle ferreed will alternately close the ferreed contacts, shunting out the high impedance winding, and open the contacts thereby placing the high impedance winding in the series control conductor. By detecting the impedance state of the control conductors between terminals of the network the busy or idle state of the possible paths within the network can be thus determined. Specifically, the control circuitry is arranged so that when the path is idle the busy-idle ferreed is operated and the high impedance winding is not included in the control conductor. Upon pulsing the control conductor to establish a path through the network, the busy-idle ferreed is released since only one of its windings is included in the control conductor. Accordingly, when the switching path is busy the control conductor presents a high impedance state to the control circuitry.

It is also characteristic of differentially wound ferreed networks that network paths within the network need not be taken down upon termination of the need for communication transmission over such paths. However, in embodiments of my invention termination of such need is detected and the same control conductors which were enabled to establish the path are pulsed to change the state of the busy-idle ferreeds in the path control conductors. In accordance with an aspect of my invention a control pulse of the same polarity as was used to establish the network path is again applied to the control conductors to effect the desired change in memory state. This pulse will have no effect on the ferreed crosspoints within the network. However, as the busy-idle ferreed had been released when the path was established, both of its windings are in series in the control conductor and the busy-idle ferreed operates, again removing the high impedance winding from the control conductor and restoring the control conductor to its low impedance or idle state.

It is therefore apparent that successive applications of control pulses to the control conductor serve to shift the busy-idle state of the busy-idle ferreed.

While the differential ferreeds are described herein as containing two windings it is to be understood that, as more fully set forth in the above-mentioned Lowry patent, each of these windings may advantageously comprise two sections, each positioned on one of the two remanent members of the ferreed switch.

In accordance with one feature of my invention a module of a multistage switching network is constructed of a plurality of electromechanical crosspoint switches, each switch having a plurality of input links and a plurality of output links and the output links of each of the switches of each stage include a busy-idle memory element which is responsive to a first network control signal over a link control path for setting the busy-idle element to a first busy state and responsive to the next succeeding control signal over the same control path to reset the memory element to a second idle state.

In accordance with another feature of my invention a differentially wound ferreed switch having one high impedance winding connected in parallel with make contacts of the switch comprises the link busy-idle element.

The above and other objects and features of my invention may be understood from the following description of the illustrative embodiment when read with respect to the drawing, in which.

Figure 1:
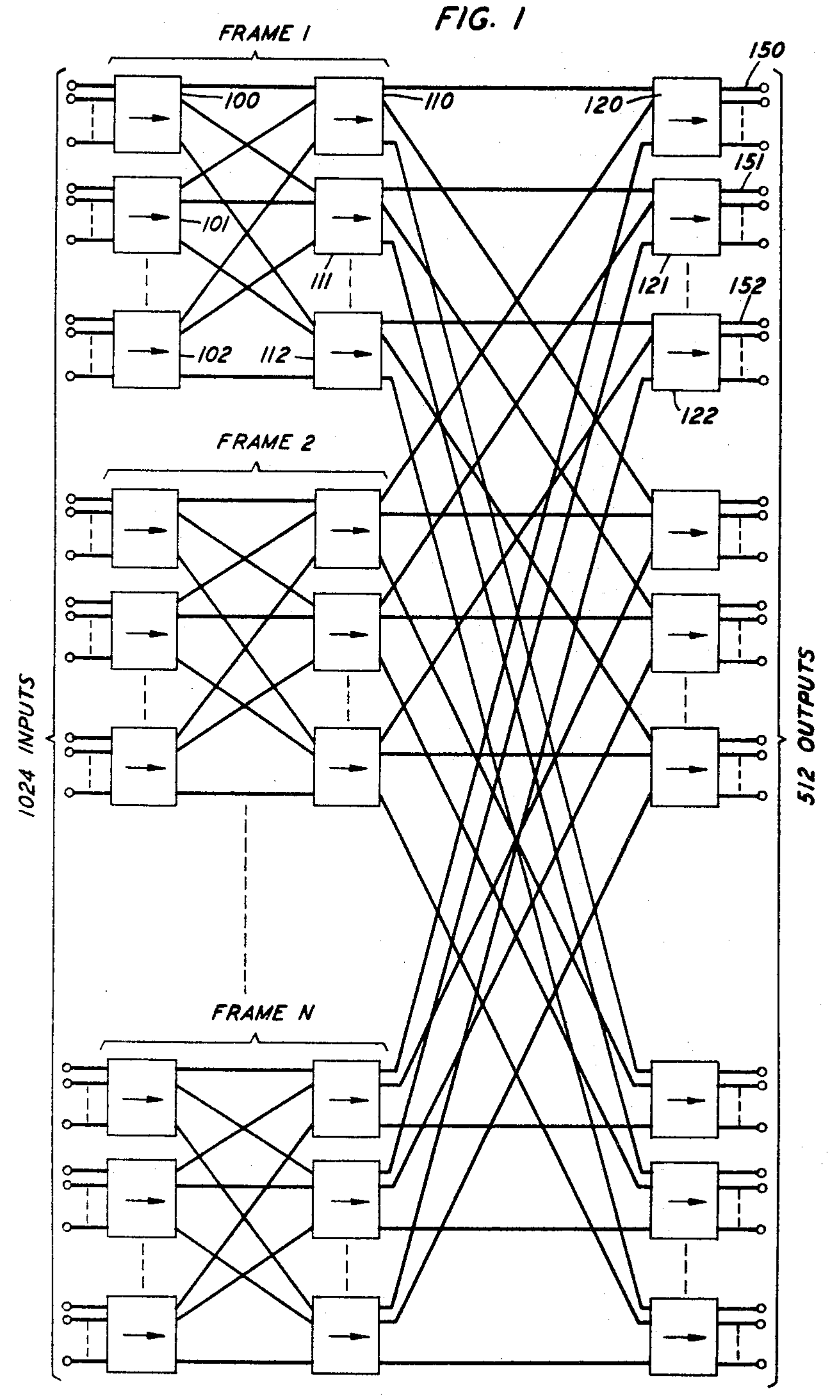
FIG. 1 is a symbolic representation of a three stage switch module.
Figure 4C:
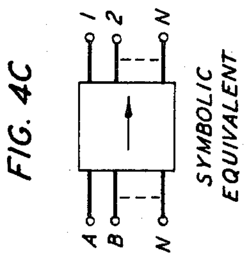
FIG. 4C is a symbolic representation of the switch of FIGS. 4A and 4B.

Before describing the switch incorporating busy-idle memory elements in accordance with my invention, as more fully shown in FIG. 4, it may be advantageous to describe one illustrative switching network in which my invention may be included. In FIG. 1 the individual switches are to be understood as being of the type depicted in FIG. 4, the symbolic equivalent being shown in FIG. 4C.

The switching network module of FIG. 1 comprises three stages of switching and each switching stage comprises a plurality of independent switches. This network module provides a single communication path between the input links of a first stage switch and the output links of a third stage switch. In the illustrative embodiment concentration is provided between the input links and the output links of the first stage switches; however, the second and third stage switches each have equal numbers of input and output links. This is not an essential element of this invention but, rather, these arrangements are assumed for purposes of illustration only. Assume, for example, that each of the first stage switches such as 100, 101, 102, et cetera, each have 16 input links and 8 output links and that each of the second stage switches such as 110, 111, 112, et cetera, and each of the third stage switches such as 120, 121 and 122 have 8 input links and 8 output links. The switching network module of FIG. 1 may be termed a superframe and in the illustrative embodiment this superframe comprises 64 switches per stage and since each first stage switch serves 16 input links, a superframe serves 1,024 input links. The superframe has 512 output links terminating on the third stage switches which also are 64 in number.

Figure 2:
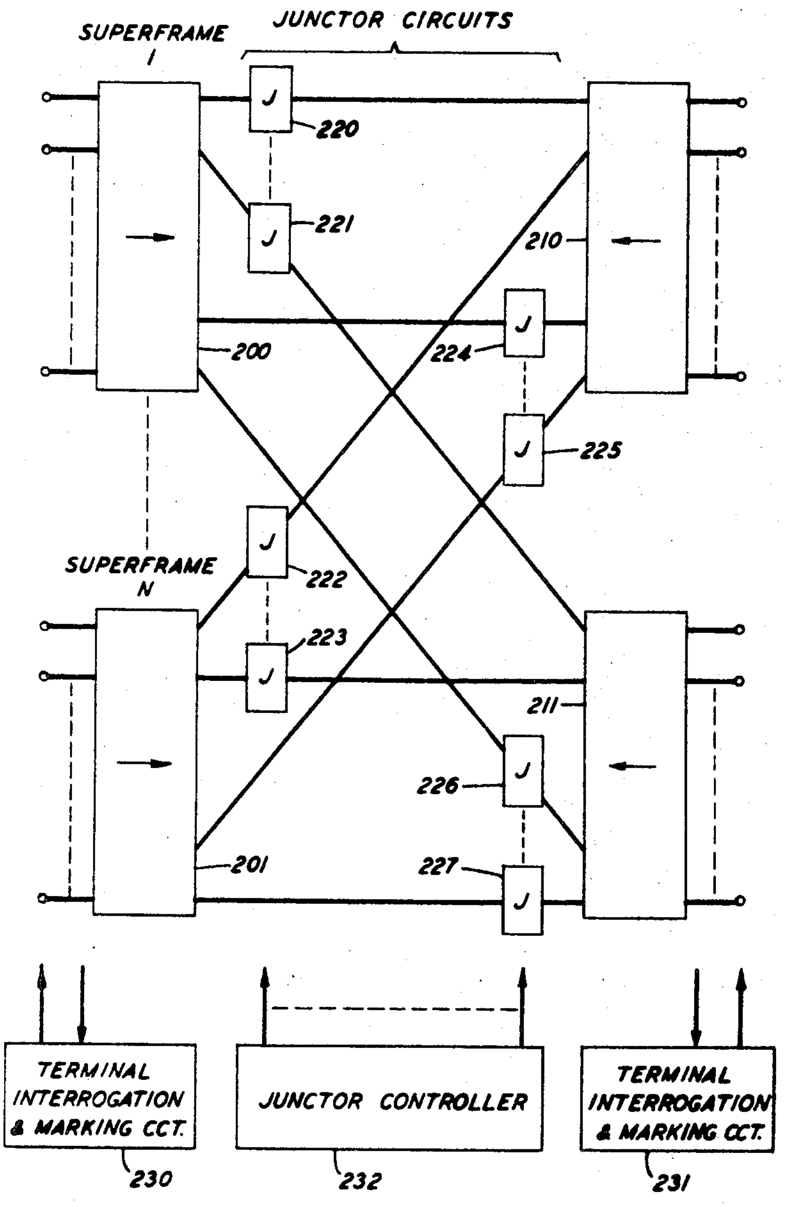
FIG. 2 is a symbolic representation of a six stage switching network comprising a plurality of modules of FIG. 1.

A six stage switching network which comprises a plurality of superframes is illustrated in FIG. 2. This network comprises a plurality of left side superframes such as 200 and 201 and a plurality of right side superframes such as 210 and 211. The right side superframes are a mirror image of the left side superframes in the illustrative embodiment. That is, the number of output terminals terminating on the right side of the network is equal to the number of input terminals terminating on the left side of the network. The output links of the left superframes are connected to the input links of the right superframes in a pattern such as is shown in FIG. 2. Superframe interconnection is established through junctor circuits such as 220 through 227. As shown at the bottom of FIG. 2, terminal interrogation and marking circuits 230 and 231 in conjunction with the junctor controller 232 serve to identify idle paths between selected terminals of the network and to effect marking of the network terminals to establish the desired network paths. In accordance with an aspect of my invention this identification of idle paths is attained by detecting the impedance of the control conductor path, as described further below with reference to FIG. 4.

As seen in FIG. 1, there is only one possible path between a group of input terminals served by a switch such as 100, 101, 102 and superframe output links such as 150, 151, 152, et cetera. The wiring pattern shown in FIG. 2, however, provides a plurality of paths between a left side input terminal and a right side output terminal. The junctors 220 through 227 are assigned to junctor blocks. The junctors of a block provide paths between different groups of input and output terminals of a superframe. Accordingly, there is never more than one junctor within a junctor group which can be employed to provide a network path between a selected left side input terminal and a selected left side output terminal. In other terms, the plurality of possible paths between selected input and output terminals are provided individually in the different junctor groups. It is thus possible to locate an idle path through the network by sequentially enabling the junctor groups. The plurality of paths between a selected left side input terminal and a selected right side output terminal are shown by way of example in FIG. 3.

As just described, the sesquential enabling of the junctor groups together with the terminal interrogation and marking circuits 230 and 231 serve to locate an idle path through the network because, in accordance with an aspect of my invention, each control conductor in each switch within the network modules includes a busy-idle memory element and specifically includes a particular differential ferreed series connected in each control conductor. Referring to FIG. 4A, these busy-idle ferreeds have control windings D— and $\underline{D}$— and contacts *d*—. Before describing these elements, however, the individual switches themselves will be first discussed.

Figure 4B:
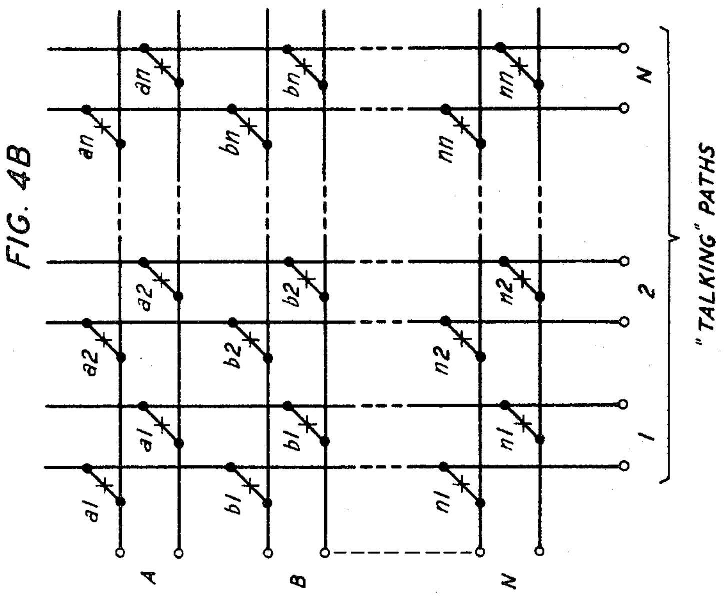
FIG. 4B shows the transmission paths associated with the control conductors of FIG. 4A.
Figure 4A:
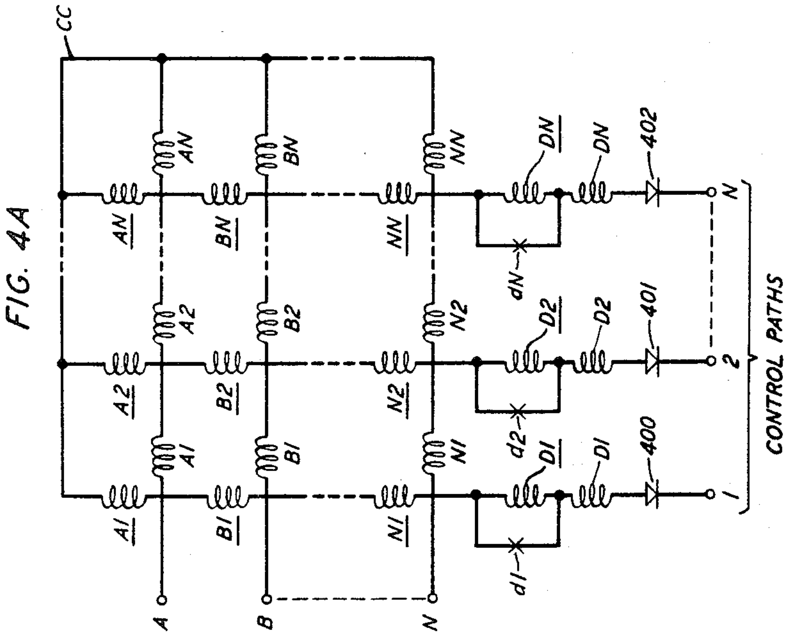
FIG. 4A is a schematic representation of the control conductors of one switch of the network of FIG. 1.

FIGS. 4A and 4B illustrate the individual switches such as 100, 101, 102, 110, 111, 112, 120, 121, 122 which make up the superframe of FIG. 1. FIG. 4A shows a coordinate array of differentially wound ferreed switches which provide selectively connections between the input links and the output links of the individual switch. The differentially wound ferreed switch is described in T. N. Lowry, Patent No. 3,037,085, issued May 29, 1962, and in the Bell System Technical Journal for January 1960, vol. 39, No. 1, at pp. 1 through 30, in an article entitled "The Ferreed—A New Switching Device" by Messrs. A. Feiner, C. A. Lovell, T. N. Lowry and P. G. Ridinger. Each ferreed switch comprises two windings such as A1, $\underline{\textbf{A1}}$ which are termed the row control windings and the column control windings, respectively. The construction of a ferreed switch is such that coincident energization of the two coils A1, $\underline{\textbf{A1}}$ in the appropriate relationship tends to effect a closure of the contacts associated with the coils. FIG. 4A shows the interconnections of the row windings of the ferreed switches by means of row control conductors and the interconnection of the column control windings of the ferreed switches by column control conductors. One end of each column control conductor and one end of each row control conductor are connected by a conductor CC, defining a configuration further described in W. S. Hayward Patent No. 3,110,772, issued Nov. 12, 1963. The energization of either one but not both of the control windings of an individual ferreed switch tends to cause the switch contacts to release. In the illustrative example of FIG. 4A, a connection can be achieved between a selected input link and a selected output link by applying marking potentials to the control conductor of the selected row and to the column control conductor of selected columns. For example, in FIG. 4A marking the terminal A row control conductor and terminal N column conductor serves to close the switch contacts associated with the windings AN, $\underline{AN}$ and tends to release the contacts of the switches having coil windings in series with coil AN and the swtches in the column having windings in series with the coil $\underline{AN}$. Thus, after the desired connection between the A input link and the N output link has been established, all prior connections to these input and output links will have been released.

In the illustrative embodiment the switching network is considered to comprise 2-wire talking paths. The talking path conductors associated with the control conductors of FIG. 4A are shown in FIG. 4B. In the example where the coils AN and $\underline{AN}$ were simultaneously energized by applying marking potentials to the A input link control conductor and the N output link control conductor the contacts *an* would be closed.

As shown in FIG. 4A, each switch output link includes a busy-idle element in circuit therewith, in accordance with my invention. In this one illustrative embodiment the busy-idle element comprises a differentially wound ferreed switch having windings such as D1, $\underline{D1}$ and contacts such as *d1* shunting the windings such as $\underline{D1}$. The windings D1, $\underline{D1}$ are differentially wound and the impedance of the winding $\underline{D1}$ is much larger than the impedance of the winding D1. The diodes 400, 401 and 402 serve to isolate the control paths in the network to avoid the effects of sneak path currents. The diodes are employed in the illustrative embodiment; however, the control conductors of individual switches may be selectively enabled by means of switch control relays, the contacts of which serve to make the various paths disjunctive.

Figure 3:
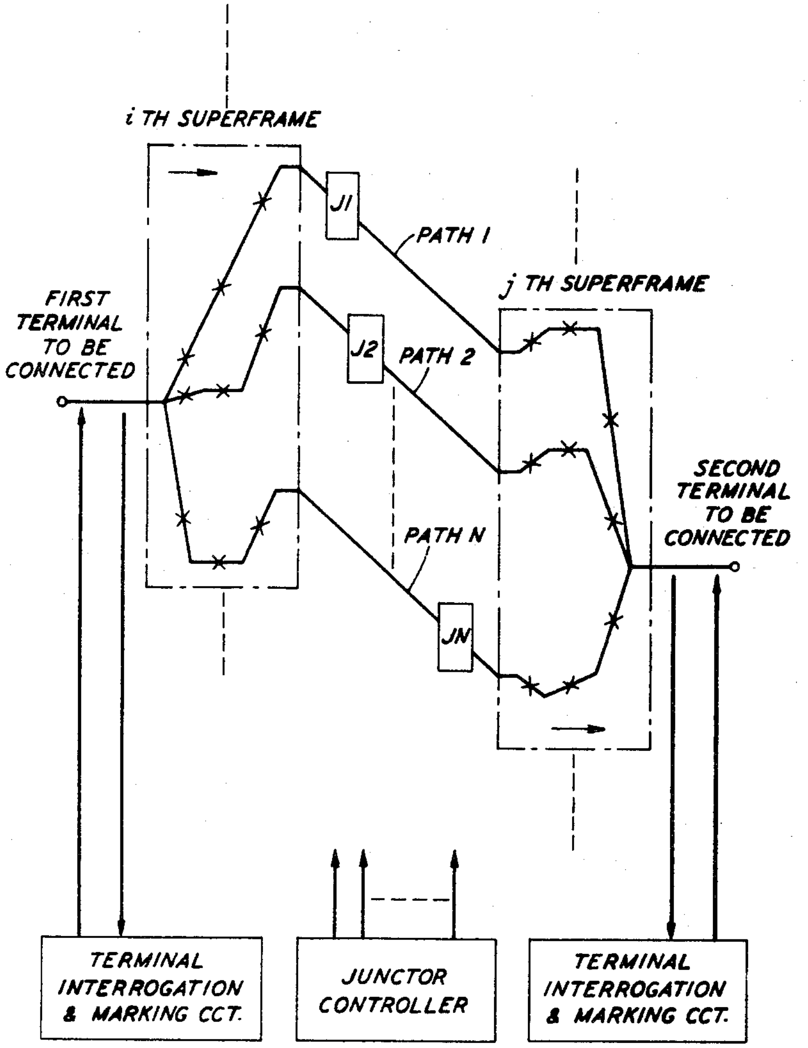
FIG. 3 is a schematic representation of possible connections between selected terminals of the network of FIG. 2.

As illustrated in FIG. 3, the possible paths between a selected left side input terminal and a selected right side output terminal each comprise six switching stages and all links of a possible path must be idle if that path is to be employed in establishing a desired connection. Since the individual links may each be used in several possible network paths, it is necessary to interrogate all of the links of a path when determining the busy-idle state of that path. The availability of a path is determined as follows. Since the memory element windings $\underline{D1}$, $\underline{D2}$, $\underline{DN}$ are of high impedance compared to the associated windings D1, D2 and DN, it is possible to readily determine whether or not the switch contacts such as *d2* associated with an output link are opened or closed. The row control windings and the column control windings of the ferreed switches which are employed at the crosspoints are low impedance and although many of these are in series with the windings such as D1, the total impedance represented by a serial path between a marked input terminal and a marked output terminal is relatively small compared to a path having a high impedance memory element winding such as $\underline{D1}$, $\underline{D2}$, and $\underline{DN}$ in series therewith.

In the arrangements of FIG. 3 the availability of the plurality of paths provided by means of the junctors J1, J2, JN, et cetera, must be considered individually in determining an idle path between a selected input and a selected output terminal. This can be accomplished most economically by sequentially enabling the junctor groups in which the junctors J1, J2, JN occur. Interrogate marking potentials are applied to a control conductor of a left side input link and to the control conductor of a right side output link and then the junctor groups are sequentially enabled. If an interrogate path is found to be in the low impedance state, the path provided by the enabled junctor group is idle and may be seized to provide the desired interconnection. However, if the path provided by the enabled junctor group is in the high impedance state, then at least one link of the path is in prior use and this path cannot be employed in establishing a new connection. After a low impedance state has been found the control path is pulsed with a high amplitude current to effect the desired switched connection.

When it is determined that an established connection is no longer required, steps must be taken to change the busy-idle elements of the links employed in the connection from the busy to the idle state. As explained with respect to the busy-idle element of FIG. 4, the state of the busy-idle element is changed by successive control signals; that is, a relay having windings such as D1, $\underline{D1}$ and contacts *d1* alternates from a state in which the contacts *d1* are opened and a state in which the contacts *d1* are closed under the influence of successive control pulses.

Since there are a plurality of possible paths between the connected first stage and last stage terminals, steps must be taken to assure pulsing of the appropriate control path at time of release. Specific arrangements for effecting this control are not shown herein; however, a number of alternative schemes would satisfy this requirement. For example, a separate memory wherein there is a record of junctors employed in providing each connection would provide a basis for pulsing the appropriate control path. Alternatively, a trace function wherein a distinctive signal is applied at one of the terminals to be released and detected at the junctor circuit would provide a basis for pulsing the appropriate path at time of release.

It is to be understood that the above description is but illustrative of the principles of this invention and that many variations may be made by one skilled in the art without departing from the spirit and scope of the invention.

What is claimed is:

1. A telephone switching network comprising
a plurality of stages of switches,
each switch comprising a plurality of input links, a plurality of output links and a plurality of switching means for selectively interconnecting said input links and said output links,
said input links and said output links each comprising only a transmission path and a control conductor for selectively enabling said switch means; and
each output link control conductor includes the two control windings of a differentially wound ferreed switch in series therewith, a contact of said ferreed switch being connected in parallel with one winding of said ferreed switch.

2. A telephone switching network comprising
a plurality of input links, a plurality of output links and a plurality of switching means for selectively interconnecting said input links and said output links,
said input links and said output links each comprising only a transmission path and a control conductor for selectively enabling said switching means, and
means, including a bistable memory element discrete to each output link connected to said control conductor thereof,
the memory element of an output link being responsive to signals on said control conductor of said output link for setting the memory element to first and second busy and idle states in response to the successive signals occurring on said control conductor of said output link for operating said switching means.

3. A switching network in accordance with claim 2 wherein said memory element comprises a differentially wound ferreed switch which comprises a first high impedance winding, a second low impedance winding and switch contacts connected in parallel with said high impedance winding.

4. In a communication switching network having an array of network control conductors, means included in each of said control conductors for indicating the busy-idle state of paths within said network, said means comprising a differentially wound ferreed switch which comprises a pair of series connected windings in series in each of said conductors, one of said windings being of substantially greater impedance than the other of said wnidings, and contact means controlled by said windings and connected across said high impedance one of said windings.

5. In a switching network, a plurality of differential ferreeds arranged in a coordinate array, a plurality of row and a plurality of column control conductors for said ferreeds, and a busy-idle differential ferreed in each of said column control conductors, each of said busy-idle ferreeds including a first winding and a second high impedance winding series connected in said control conductor and contacts connected in shunt of said high impedance winding.

References Cited

UNITED STATES PATENTS

| | | |
|---|---|---|
| 3,247,325 | 4/1966 | Han et al. |
| 3,249,699 | 5/1966 | Mol et al. |
| 3,288,939 | 11/1966 | Spellnes. |

WILLIAM C. COOPER, *Primary Examiner.*

LAWRENCE A. WRIGHT, *Assistant Examiner.*